United States Patent Office 3,357,966
Patented Dec. 12, 1967

3,357,966
STATIC CHARGE ELIMINATION IN POLYETHYLENE
Hans R. Larsen, Montreal, Quebec, Canada, assignor to Union Carbide Canada Limited, East Toronto, Ontario, Canada, a company of Canada
No Drawing. Filed Jan. 15, 1965, Ser. No. 425,947
12 Claims. (Cl. 260—94.9)

This invention relates to the elimination or reduction of static charges on polyethylene which occur when polyethylene is extruded. More specifically, this invention relates to processes for extruding polyethylene having zero, or only a low static charge; to the products produced by such processes; and to extrudable compositions of matter which may be used in the carrying out of such processes.

Certain polyethylene resins, particularly those of the linear high density type, have been found to have a very high charge of static electricity when extruded. The presence of this charge is undesirable in that it causes the extruded parison to be attracted to the nearest grounded object. In the blow moulding process, for example, the nearest grounded object to the extruded parison is not necessarily the centre of the blow moulding die which the parison is required to enter, and, consequently, operational problems as to positioning etc., may arise when highly charged parisons are extruded.

In accordance with this invention it has been discovered that the inclusion of di(2-ethylhexyl) phosphoric acid in the composition to be extruded can result in the production of polyethylene having zero or only a low static charge.

Experiments have shown that this invention may be practised with advantage using polyethylene resins which have been polymerized in the presence of a complex co-ordination catalyst. One suitable polyethylene resin is that produced as described in Belgian Patent No. 626,992, Manyik et al., published January 10, 1963. The process described therein involves the polymerization of ethylene in the presence of a catalyst comprising ethyl hexanoic acid salt of chromium in conjunction with aluminum alkyl hydrolyzed by water, the molar ratio of aluminum to water being 1:1, and the operating conditions being at a temperature of about 60° C. and a pressure of less than 150 p.s.i.

Other suitable polyethylene resins for use in accordance with this invention are those produced by processes set out in the following exemplary patents: Canadian Patent No. 605,372, issued September 20, 1960, Larchar and Pease; Belgian Patent No. 538,782, published December 8, 1955; United States Patents Nos. 2,825,721, issued March 26, 1956, Hogan et al.; and Standard Oil Patents 2,692,257; 2,692,258 and 2,692,259 each issued October 19, 1954. It will be noted that all of the processes described in the aforementioned patents are low pressure processes, i.e., polymerization takes place under a pressure less than about 200 p.s.i.a., as opposed to high pressure processes involving pressures in excess of 2500 p.s.i.a.

Di(2-ethylhexyl) phosphoric acid is a mobile, amber-coloured liquid which is insoluble in water and miscible with most organic solvents. It has the following formula and physical properties:

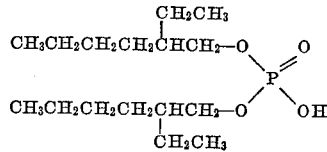

*Physical properties*

| | |
|---|---|
| Molecular weight | 322.44. |
| Apparent specific gravity, 20/20° C. | 0.9770. |
| Coefficient of expansion, 20° C. | 0.00082/° C. |
| Freezing point | Sets to a glass below —60° C. |
| Refractive index, $n_D^{20}$ | 1.4432. |
| Viscosity, 20° C. | 53.0 cps. |
| Solubility: | |
|   In water, 20° C. | <0.01% by wt. |
|   Water in, 20° C. | 2.4% by wt. |
| Average weight per gallon, 20° C. | 8.15 lbs. |
| Flash point, Cleveland open cup | 385° F. |

The amount of di(2-ethylhexyl) phosphoric acid to be added to the extrudable polyethylene resin to provide a new and useful composition of matter in accordance with one aspect of this invention should not exceed about 1% by weight based on the weight of the polyethylene, an upper limit of about 0.5% being preferred. It has been found that if an amount of di(2-ethylhexyl) phosphoric acid above about 1% is used, the colour and crack resistance characteristics of the extruded polyethylene are adversely affected. On the other hand, very small amounts of this additive e.g., 0.05% decrease the static charge of the polyethylene extruded from the composition, greater amounts of the additive generally being more effective in this regard than smaller amounts.

In order to produce a new and useful composition of matter in accordance with this invention the extrudable pellets of a polyethylene resin polymerized in the presence of a complex co-ordination catalyst may be coated with di(2-ethylhexyl) phosphoric acid in a V-blender or similar device, or the composition may be prepared by intensive mixing (banburying). In the event that the former procedure is followed, in order to obtain improved dispersion it is desirable that the di(2-ethylhexyl) phosphoric acid be dissolved in a relatively large amount of a suitable inert solvent such as hexane. After this solution has been coated onto the pellets, the solvent may be removed by evaporation.

After the foregoing composition has been prepared, it may be extruded in a conventional manner using conventional equipment to produce extruded polyethylene embodying another aspect of this invention and having any desired shape or configuration.

The following examples illustrate processes embodying still another aspect of this invention and the results obtained thereby. Two of the resins employed, identified as Resin A and Resin B, both were produced by the process described in the aforementioned Belgian Patent No. 626,992, Resin A having a density of 0.953 g./cu. cm. and a melt index of 0.27 dg./min., Resin B having a density of 0.962 g./cu. cm. and a melt index of 0.33 dg./min. The resin, identified as Resin C, was produced by the process described in the aforementioned U.S. Patent No. 2,825,721 and has a density of 0.950 g./cu. cm. and a melt index of 0.30 dg./min.

The melt index of the polyethylene resins used was determined in accordance with ASTM procedure D–1238–57T, condition E. This property is a measure of the rate of extrusion of a polyethylene resin at 190° C. under 44 p.s.i. pressure through a die having a diameter of 0.0825 inch and a land length of 0.315 inch. It is expressed in decigrams per minute.

The density of the polyethylene resins used was determined at a temperature of 23° C. in accordance with the density gradient technique described in ASTM test procedure D–1505–60T, Method A, using isopropanol and an aqueous sodium acetate solution as the liquid for the density gradient. The test specimens were cut from compression molded plaques and conditioned for the density determination according to the procedure outlined in ASTM test procedure D–1248–59T, Paragraph 6 (C).

The static charge was measured on the extruded resins as they were extruded from a 1″ extruder in the form of a 5″ wide molten tape. The details of the extruder are as follows:

Manufacturer _____ Wilmod Machinery Company.
Barrel diameter _____ 1 inch.
L/D ratio _____ 24:1.
Die _____ 5 inches long sheet die with 20-mil lip opening.
Temperature, Zone 1 (feed end) _____ 375° F.
Temperature, Zone 2 ____ 375° F.
Temperature, die _____ 380° F.

The static charge was measured on the molten tape approximately 1″ below the die. A Keithley 250 static meter with a 2501 detecting head was used to measure the static charge. The Keithley meter gives a reading in KV which is indicative of and can be converted to a value for charge density.

Before the evaluation of each additive-containing sample, the extruder was purged with base resin. As can be seen from Tables I, II and III hereinafter, it took approximately 5 minutes, measured from the time the resin was poured into the extruder hopper, before the unmodified base resin was out of the extruder and the charge stabilized at a value characteristic of the sample being tested.

In carrying out the processes, the results and conditions of which are tabulated in Table I, the additive, di(2-ethylhexyl) phosphoric acid, in varying amounts was mixed (V-blended) with the different resins and then extruded using the aforementioned type of extruder operating under the conditions set out hereinbefore and also under those conditions tabulated in Table I.

The same procedure was followed for deriving the results shown in Table II except that the extrudable compositions were Bolling mixed. The compound temperature was measured where the polyethylene emerged from the die.

In Table III, the results derived from the same procedure as used for Table II, show the additive is effective in preventing a negative static charge build-up.

TABLE I.—EVALUATION OF STATIC CHARGE RETENTION OF V-BLENDED SAMPLES

[Additive—di(2-ethylhexyl) phosphoric acid]

| | | Sample | | | | | | | |
|---|---|---|---|---|---|---|---|---|---|
| | Units | #1 | #2 | #3 | #4 | #5 | #6 | #7 | #8 |
| | | Base Resin | | | | | | | |
| | | A | A | A | A | B | B | B | B |
| Additive, Concentration | Percent by weight of resin | (1) | .05 | 0.10 | 0.15 | (1) | .05 | .10 | .15 |
| Room Temperature | °F | 80 | 80 | 80 | 79 | 78 | 79 | 80 | 84 |
| Relative Humidity | Percent | 54 | 53 | 52 | 51 | 52 | 51 | 51 | 52 |
| Extruder | | (2) | (2) | (2) | (2) | (2) | (2) | (2) | (2) |
| Current Draw | Amps | ~4 | ~4 | 3.8 | 3.8 | ~4 | ~4 | ~4 | ~4 |
| Compound Temperature | °C | 195 | 195 | 197 | 200 | 195 | 195 | 195 | 190 |
| Output | G./sec | 2.84 | 2.88 | 2.89 | 2.84 | 2.55 | 3.85 | 3.53 | 3.45 |
| Screw Speed | R.p.m | 180 | 180 | 180 | 180 | 445 | 445 | 445 | 360 |
| Static Charge, Keithley Meter After: | | | | | | | | | |
| 0 mins | KV | +20 | +22 | +14 | +24 | +28 | +16 | +20 | +20 |
| 2 mins | KV | +20 | +18 | +5 | +2 | +20 | +1 | 0 | 0 |
| 5 mins | KV | +24 | +18 | +5 | 0 | +20 | 0 | 0 | 0 |
| 10 mins | KV | +24 | +18 | +5 | 0 | +20 | +1 | 0 | 0 |
| 15 mins | KV | +24 | +18 | +5 | 0 | +20 | +1 | 0 | 0 |

1 Control.
2 1″ Wilmod.

TABLE II.—EVALUATION OF STATIC CHARGE RETENTION OF BOLLING MIXED SAMPLES

[Additive—di (2-ethylhexyl) phosphoric acid]

| | | Sample | | | | | | | | | |
|---|---|---|---|---|---|---|---|---|---|---|---|
| | Units | #9 | #10 | #11 | #12 | #13 | #14 | #15 | #16 | #17 | #18 |
| | | Base Resin | | | | | | | | | |
| | | A | A | A | A | B | B | B | B | B | B |
| Additive, Concentration | Percent by wt. of resin | (1) | .15 | .20 | .30 | (1) | .05 | .10 | .15 | .20 | .30 |
| Room Temperature | °F | 80 | 79 | 79 | 79 | 83 | 75 | 76 | 84 | 86 | 86 |
| Relative Humidity | Percent | 53 | 50 | 47 | 46 | 52 | 38 | 37 | 54 | 52 | 52 |
| Extruder | | (2) | (2) | (2) | (2) | (2) | (2) | (2) | (2) | (2) | (2) |
| Current Draw | Amps | 3.8 | 3.8 | 3.8 | 3.8 | 3.8 | 3.75 | 3.75 | 4 | 4 | 4 |
| Compound Temperature | °C | 195 | 197 | 200 | 198 | 197 | 200 | 200 | 195 | 195 | 190 |
| Output | G./sec | 2.84 | 2.96 | 2.85 | 2.86 | 3.31 | 2.75 | 2.78 | 4.25 | 4.36 | 4.22 |
| Screw Speed | R.p.m | 180 | 180 | 180 | 180 | 360 | 180 | 180 | 360 | 360 | 360 |
| Static Charge, Keithley Meter After: | | | | | | | | | | | |
| 0 mins | KV | +14 | +18 | +20 | +18 | +20 | +22 | +16 | +16 | +16 | +18 |
| 2 mins | KV | +18 | +2 | +2 | 0 | +20 | +10 | +1 | 0 | 0 | 0 |
| 5 mins | KV | +18 | 0 | 0 | 0 | +22 | +10 | 0 | 0 | 0 | 0 |
| 10 mins | KV | +18 | 0 | 0 | 0 | +24 | +8 | +1 | 0 | 0 | 0 |
| 15 mins | KV | +18 | 0 | 0 | 0 | +24 | +8 | +1 | 0 | 0 | 0 |

1 Control.
2 1″ Wilmod.

TABLE III.—EVALUATION OF STATIC CHARGE RETENTION OF BOLLING MIXED SAMPLES

[Additive—di(2-ethylhexyl) phosphoric acid]

| | Units | Sample #19 | Sample #20 |
|---|---|---|---|
| | | Base Resin C | Base Resin C |
| Additive, Concentration | Percent by wt. of resin | (1) | 0.20 |
| Room temperature | °F | 70 | 70 |
| Relative humidity | Percent | 32 | 33 |
| Extruder | | (2) | (2) |
| Current draw | Amps | 4.3 | 4.3 |
| Compound temperature | °C | 204 | 203 |
| Output | G./sec | 3.2 | 3.23 |
| Screw speed | P.s.i | 210 | 210 |
| Static Charge, Keithley Meter After: | | | |
| 0 mins | KV | −1 | −5 |
| 2 mins | KV | −1 | +1.5 |
| 5 mins | KV | −1 | +1.5 |
| 10 mins | KV | −5 | +1.5 |
| 15 mins | KV | −5 | +1.5 |

1 Control.
2 1" Wilmod.

From Tables I, II and III, it will be seen that in all cases the static charge of the extruded polyethylene was reduced as compared to the control sample, that it many cases the static charge was eliminated completely, and that best results were obtained with the higher amounts of the additive.

From the foregoing it will be seen that I have provided new and useful extrudable compositions of matter, new and useful processes for extruding such compositions of matter, and new and useful extruded products.

Insofar as the extruded products are concerned, it appears likely that during the extrusion process a chemical reaction or reactions involving the polyethylene and the di(2-ethylhexyl) phosphoric acid takes place, but this has not been confirmed, and, consequently, the exact chemical nature of the extruded products is not known.

While preferred embodiments of this invention have been disclosed herein, those skilled in the art will appreciate that changes and modifications may be made therein without departing from the spirit and scope of this invention as defined in the appended claims.

The embodiments of the invention in which an exclusive property or privilege is claimed are defined as follows:

1. An extrudable composition of matter comprising a mixture containing (a) polyethylene which has been polymerized in the presence of a complex co-ordination catalyst, and (b) di(2-ethylhexyl) phosphoric acid.

2. An extrudable composition of matter according to claim 1 wherein the amount of said di(2-ethylhexyl) phosphoric acid is less than about 1% by weight of the weight of said polyethylene.

3. An extrudable composition of matter according to claim 1 wherein the amount of said di(2-ethylhexyl) phosphoric acid is less than about 0.5% by weight of the weight of said polyethylene.

4. An extrudable composition of matter according to claim 3 wherein the amount of said di(2-ethylhexyl) phosphoric acid is greater than about 0.05% by weight of the weight of said polyethylene.

5. An extrudable composition of matter comprising a mixture containing (a) polyethylene which has been polymerized by a low pressure process in the presence of a complex co-ordination catalyst, and (b) di(2-ethylhexyl) phosphoric acid.

6. An extrudable composition of matter according to claim 5 wherein the amount of said di(2-ethylhexyl) phosphoric acid is less than about 0.5% by weight of the weight of said polyethylene.

7. An extrudable composition of matter according to claim 5 wherein said polyethylene which has been polymerized in the presence of a catalyst comprising ethyl hexanoic acid salt of chromium in conjunction with aluminum alkyl hydrolyzed by water, the molar ratio of said aluminum to said water being 1:1 and the polymerizing conditions being at about 60° C. and at a pressure less than about 150 p.s.i.a.

8. An extrudable composition of matter comprising a mixture containing polyethylene and di(2-ethylhexyl) phosphoric acid.

9. An extruded product extruded from a mixture containing polyethylene, and di(2-ethylhexyl) phosphoric acid.

10. An extruded product extruded from a mixture containing (a) polyethylene which has been polymerized in the presence of a complex co-ordination catalyst, and (b) di(2-ethylhexyl) phosphoric acid.

11. An extruded product extruded from a mixture containing (a) polyethylene which has been polymerized by a low pressure process in the presence of a complex co-ordination catalyst, and (b) di(2-ethylhexyl) phosphoric acid.

12. An extruded product according to claim 11 wherein the amount of said di(2-ethylhexyl) phosphoric acid in said mixture is less than about 1% by weight of said polyethylene.

References Cited

UNITED STATES PATENTS 3,257,337   6/1966   Schoepfle et al. _____ 260—30.6

JOSEPH L. SCHOFER, *Primary Examiner.*

L. EDELMAN, *Assistant Examiner.*